(12) United States Patent
Yee et al.

(10) Patent No.: US 12,014,232 B2
(45) Date of Patent: Jun. 18, 2024

(54) TRANSACTION CARD WITH HIDDEN VISUAL FEATURES

(71) Applicant: Capital One Services, LLC, McLean, VA (US)

(72) Inventors: Bryant Yee, Silver Spring, MD (US); Tyler Maiman, Melville, NY (US); Cruz Vargas, Ocean Springs, MS (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/961,919

(22) Filed: Oct. 7, 2022

(65) Prior Publication Data
US 2024/0119248 A1    Apr. 11, 2024

(51) Int. Cl.
| | |
|---|---|
| *B42D 25/324* | (2014.01) |
| *B42D 25/22* | (2014.01) |
| *B42D 25/23* | (2014.01) |
| *B42D 25/30* | (2014.01) |
| *G06K 19/07* | (2006.01) |

(52) U.S. Cl.
CPC ......... *G06K 19/0723* (2013.01); *B42D 25/22* (2014.10); *B42D 25/23* (2014.10); *B42D 25/30* (2014.10); *B42D 25/324* (2014.10)

(58) Field of Classification Search
CPC ...... B42D 25/22; B42D 25/23; B42D 25/324; Y10T 428/24744; Y10T 428/2462
USPC .................................................. 283/901, 902
See application file for complete search history.

(56) References Cited

U.S. PATENT DOCUMENTS

| | | | | |
|---|---|---|---|---|
| 4,671,028 | A * | 6/1987 | Figone | E04C 2/405 428/167 |
| 2007/0087186 | A1* | 4/2007 | Clarke | B29C 59/022 428/323 |
| 2007/0278315 | A1* | 12/2007 | Michalk | G06K 19/07728 235/492 |
| 2010/0194091 | A1* | 8/2010 | Heim | B42D 25/21 264/293 |
| 2015/0246571 | A1* | 9/2015 | Bielesch | B42D 25/29 359/613 |
| 2019/0092081 | A1* | 3/2019 | Tompkin | G03H 1/2645 |

FOREIGN PATENT DOCUMENTS

| | | | | |
|---|---|---|---|---|
| DE | 102009053925 A1 * | 5/2011 | | B42D 25/29 |
| EP | 670786 B1 * | 2/1997 | | B41M 3/148 |
| WO | WO-2007128426 A2 * | 11/2007 | | B42D 25/00 |

* cited by examiner

*Primary Examiner* — Kyle R Grabowski
(74) *Attorney, Agent, or Firm* — KDW Firm PLLC (57) ABSTRACT

Provided are approaches for concealing or obscuring transaction card numbers. In some approaches, a transaction card may include a body comprising a first main side opposite a second main side, and a plurality of structures extending from at least one of the first or second main sides. In a bent configuration of the body, the plurality of structures separate from one another, in a substantially flat configuration of the body, adjacent structures of the plurality of structures abut one another.

14 Claims, 6 Drawing Sheets

Providing a Transaction Card having a First Main Side Opposite a Second Main Side, a First End Opposite a Second End, and a First Side Opposite a Second Side

402

Forming a Modification Area Along the First or Second Main Side of the Body, Wherein the Modification Area Includes a plurality of Structures Separated by Trenches, Wherein in a Bent Configuration of the Body, the Plurality of Structures Separate from One Another, and Wherein in a Substantially Flat Configuration of the Body, Adjacent Structures of the Plurality of Structures Abut One Another

FIG. 5

TRANSACTION CARD WITH HIDDEN VISUAL FEATURES

FIELD

Embodiments of the present disclosure relate to transaction cards and, more particularly, to transaction cards with hidden visual features.

BACKGROUND

Transaction cards, such as credit cards and debit cards, typically contain visual account information such as the account number, owner's name, expiration date, etc. This information may be provided in different formats, and at different positions along the card. It may be desirable to hide or obscure this information to enhance card security.

It is with respect to this and other considerations that the present improvements are provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body comprising a first main side opposite a second main side, and a plurality of structures extending from at least one of the first or second main sides. In a bent configuration of the body, the plurality of structures separate from one another, and in a substantially flat configuration of the body, adjacent structures of the plurality of structures abut one another.

In another approach according to the disclosure, a transaction card may include a body comprising a first main side opposite a second main side, a first end opposite a second end, and a first side opposite a second side, and a plurality of structures extending from at least one of the first or second main sides. When the body is bent in a first direction, the plurality of structures separate from one another, and wherein when the body is bent in a second direction, adjacent structures of the plurality of structures are brought together.

In yet another approach according to the disclosure, a transaction card may include a body comprising a first main side opposite a second main side, the first main side including one or more planar sections and a modification section, and a plurality of structures within the modification section, the plurality of structures each including a pair of sidewalls extending from a base of the modification section. The transaction card may further include a visual feature formed on at least one of the pair of sidewalls or the base of the modification section, wherein in a bent configuration of the body, the plurality of structures separate from one another to expose the visual feature, and wherein in a substantially flat configuration of the body, the plurality of structures are brought together to conceal the visual feature.

BRIEF DESCRIPTION OF THE DRAWINGS

The accompanying drawings illustrate example approaches of the disclosure, including the practical application of the principles thereof, as follows.

The drawings are not necessarily to scale. The drawings are merely representations, not intended to portray specific parameters of the disclosure. The drawings are intended to depict example embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to pliable transaction cards that may be manipulated to conceal and expose card information. The transaction cards include a modification area including a series of structures (e.g., peaks and trenches), which conceal or obscure important transaction card information (e.g., card number, security code, expiration date, name) when the modification area is in an unbent configuration, and reveal the card information when the modification area is in a bent, expanded configuration.

Referring now to FIGS. 1A-1D, an example transaction card (hereinafter "card") 100 according to embodiments of the disclosure will be described. The card 100 may be a credit or debit card, a RFID passport, or an access card. Although non-limiting, the card 100 may be made from polyvinyl chloride (PVC), polyester, polycarbonate, or metal (e.g., a pure metal or metal alloy), and may include multiple layers each having one or more functions. Described sometimes herein as contactless due to the method of communication by an identification chip 102 (hereinafter "chip"), such as an EMV chip or RFID chip, the card 100 may also provide one or more functions requiring contact.

The card 100 may include a body 104 having a first main side 106 opposite a second main side 108. Although non-limiting, the first main side 106 may correspond to a front or top side of the card 100, while the second main side 108 may correspond to a back or bottom side of the card 100. The first main side 106 and the second main side are joined by a side surface extending around a perimeter of the body 104. The body 104 may further include a first end 111 opposite a second end 112, and a first side 113 opposite a second side 114. As shown, a first dimension of the body 104 extending between the first end 111 and the second end 112 is greater than a second dimension of the body 104 extending between the first side 113 and the second side 114.

As used herein, the chip 102 may be any microprocessor device configured to exchange data electromagnetically. RFID chips may include a radio frequency inductor, volatile or non-volatile memory storage, a microprocessor, circuitry logic, and/or an antenna. While in some embodiments electromagnetic data communications from RFID chips will take place at radio frequencies, other embodiments may exchange electromagnetic data at different frequencies. Although not shown, the body 104 may further include a magnetic stripe along the second main side 108.

As further shown, the body 104 of the card 100 may include one or more planar sections 120 and one or more modification areas 122, wherein the chip 102 is recessed into one of the planar sections 120. In some embodiments, the modification area 122 may include a plurality of structures 124 extending linearly between the first side 113 and the second side 114. As will be described in greater detail herein, the plurality of structures 124 may be defined by alternating trenches and vertically extending components. Stated another way, the plurality of structures 124 in some embodiments may define a plurality of alternating peaks and recessed valleys. The plurality of structures 124 may be a same or different material than the planar sections 120 of the body 104.

Figure 1A:
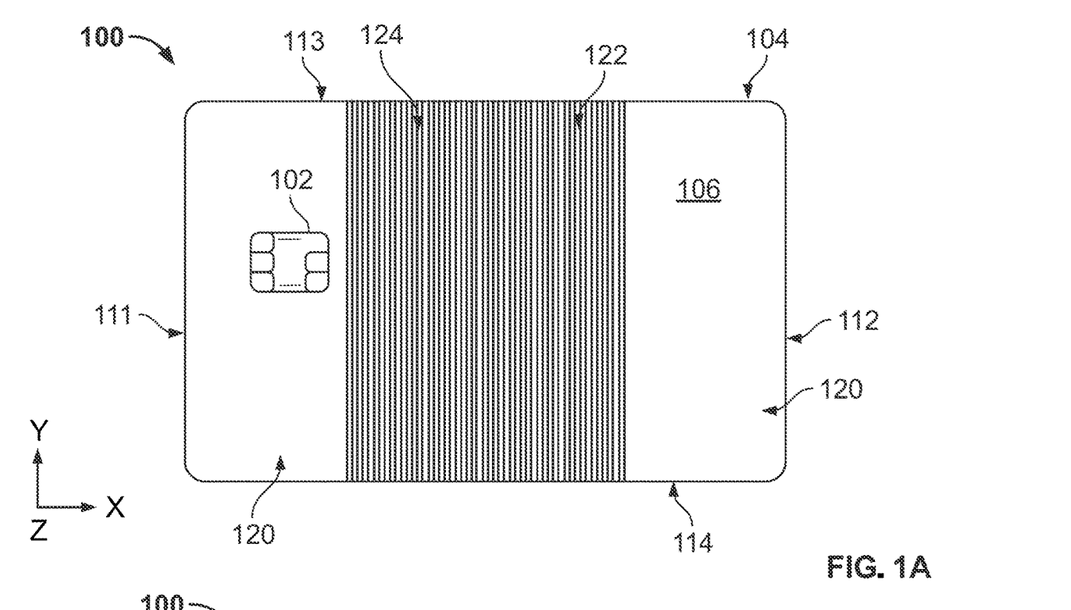
FIG. 1A is a top view illustrating a transaction card, in accordance with embodiments of the present disclosure.
Figure 1B:
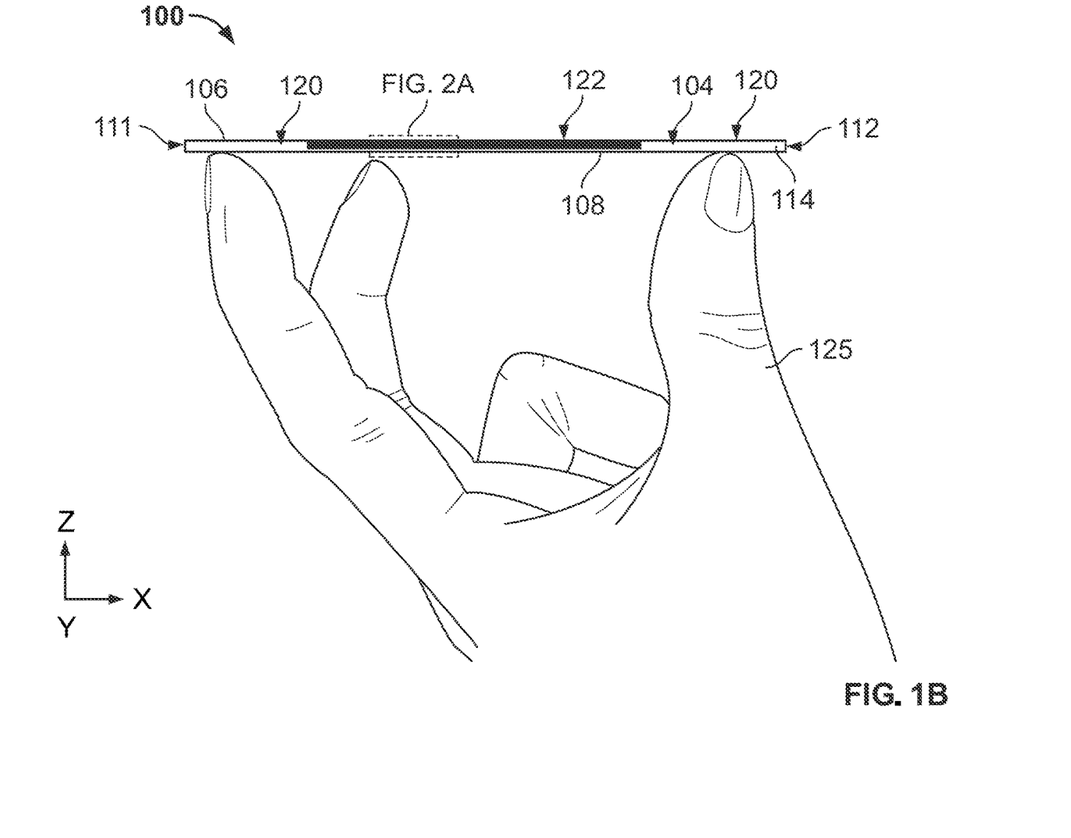
FIG. 1B is a side view illustrating the transaction card of FIG. 1A, in accordance with embodiments of the present disclosure.
Figure 1C:
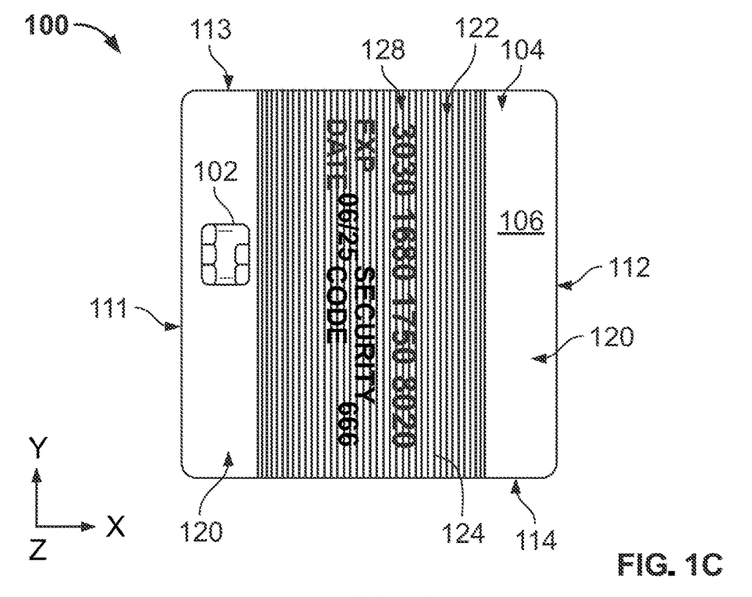
FIG. 1C is a top view illustrating the transaction card in a bent configuration, in accordance with embodiments of the present disclosure.
Figure 1D:
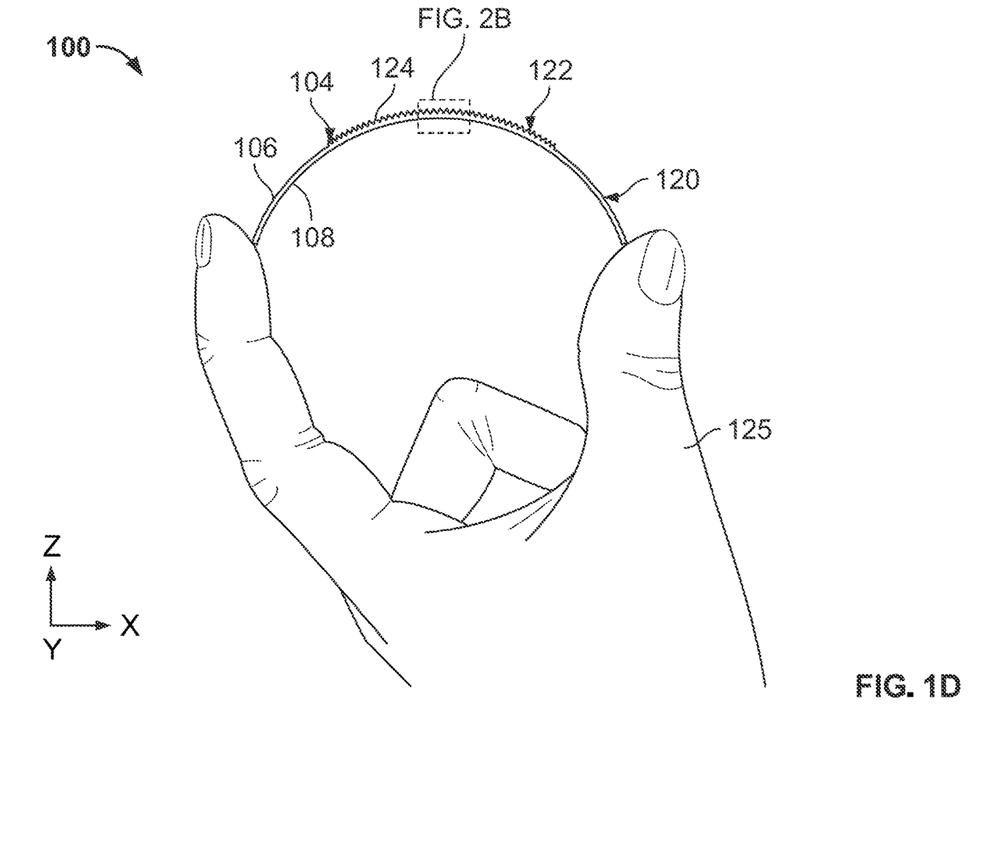
FIG. 1D is a side view illustrating the transaction card of FIG. 1C, in accordance with embodiments of the present disclosure.

The modification area 122 may represent an area of increased flexibility of the body 104 relative to the planar sections 120. For example, a user 125 may bend or flex the body 104 (e.g., in the z-direction) from the generally flat configuration shown in FIGS. 1A-1B to the curved or bowed configuration shown in FIGS. 1C-1D. In doing so, the plurality of structures 124 may correspondingly transition between a first configuration in which the plurality of structures 124 are arranged close together, and a second configuration in which the plurality of structures 124 are spread apart from one another. As shown in FIG. 1C, one or more visual features 128 present in the modification area 122 may become exposed in the second configuration. More specifically, the visual features 128 may be present along the sidewalls of the plurality of structures 124 and/or a base section extending between the plurality of structures 124 so that bending the modification area 122 to separate the plurality of structures 124 from one another causes the visual features 128 to become visible.

In non-limiting embodiments, the visual features 128 may include account identification indicia, such as the card number, account holder name, card expiration date, etc. In other embodiments, the visual features 128 may alternatively, or additionally, contain fanciful designs, colors, images, logos, etc., which may be selected to increase brand or product recognition, and/or user appeal. Although not limited to any particular material or substance, the visual features 128 may include a deposited ink.

Figure 2A:
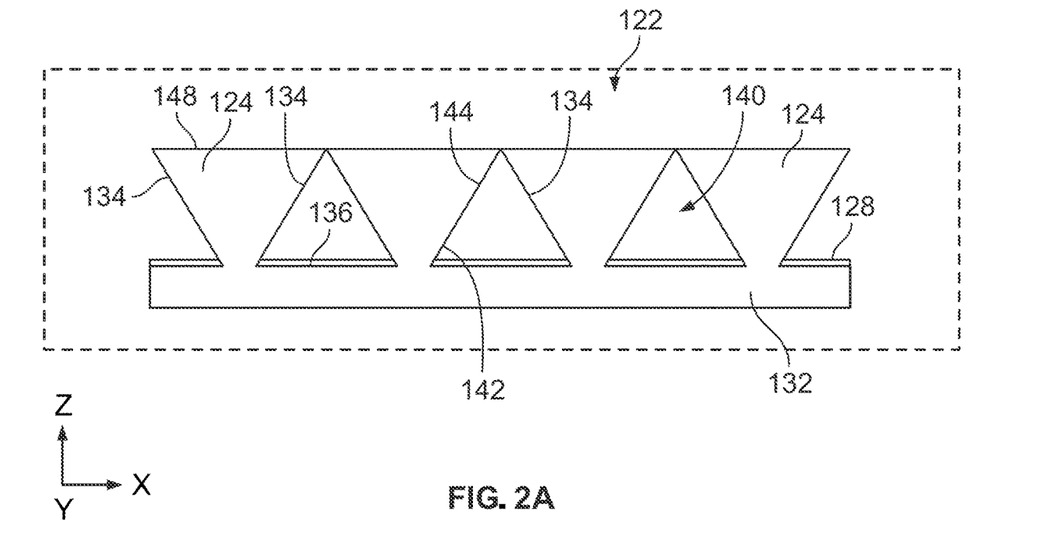
FIG. 2A is a close-up side view of a portion of the transaction card of FIG. 1B, in accordance with embodiments of the present disclosure.
Figure 2B:
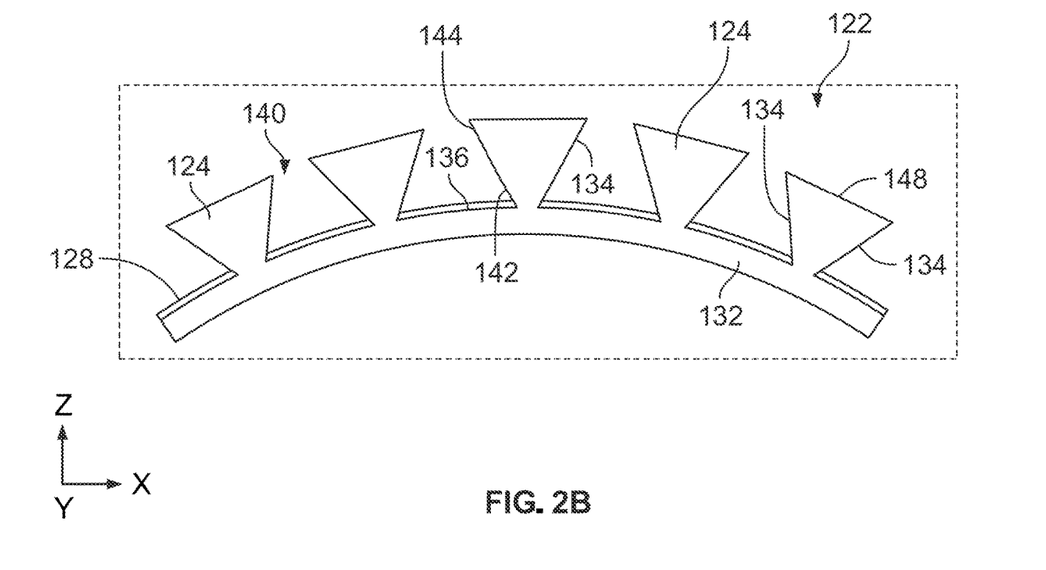
FIG. 2B is a close-up side view of the portion of the transaction card of FIG. 1D, in accordance with embodiments of the present disclosure.

Turning now to FIGS. 2A-2B, a portion of the modification area 122 according to embodiments of the present disclosure will be described in greater detail. FIG. 2A demonstrates the modification area 122 of FIG. 1B in a flat or straight configuration, while FIG. 2B demonstrates the modification area 122 of FIG. 1D in a bent or curved configuration. As shown, the modification area 122 includes the plurality of structures 124 extending from a base 132, wherein adjacent structures 124 are separated by a trench 140. Each of the structures 124 may include a pair of sidewalls 134 extending from an upper surface 136 of the base 132. More specifically, each sidewall 134 may include a lower portion 142 adjacent the upper surface 136 of the base 132, and an upper portion 144 extending from the lower portion 142. In some embodiments, each pair of sidewalls 134 may extend non-parallel to one another, causing the upper portion 144 of adjacent structures 124 to contact or abut one another. Although non-limiting, each of the structures 124 may generally have a triangle or trapezoid shape.

As shown in the flat configuration of FIG. 2A, a top surface 148 of each structure 124 may form a uniform and substantially continuous surface across the modification area 122. A plane defined by the top surface 148 of each structure 124 may be substantially coplanar with a plane defined by an upper surface of the planar sections 120 (FIGS. 1A— In other embodiments, one or more of the top surfaces 148 may be recessed relative to the upper surface of the planar sections 120. Although not shown, an additional visualization feature may be present along the top surfaces 148 of one or more of the structures 124.

As further shown, the modification area 122 may include the visualization feature 128 present along the upper surface 136 of the base 132. In other embodiments, the visual feature 128 may also be present along one or both of the sidewalls 134. When the modification area is in the flat, relaxed configuration of FIG. 2A, the visual feature 128 is not visible when viewed top down (e.g., negative z-direction) because the upper portions 144 of the structures 124 are brought together, enclosing the trenches 140. When the modification area is in the bent configuration of FIG. 2B, the visual feature 128 becomes detectable because the structures 124 are spread apart from one another.

Figure 3:
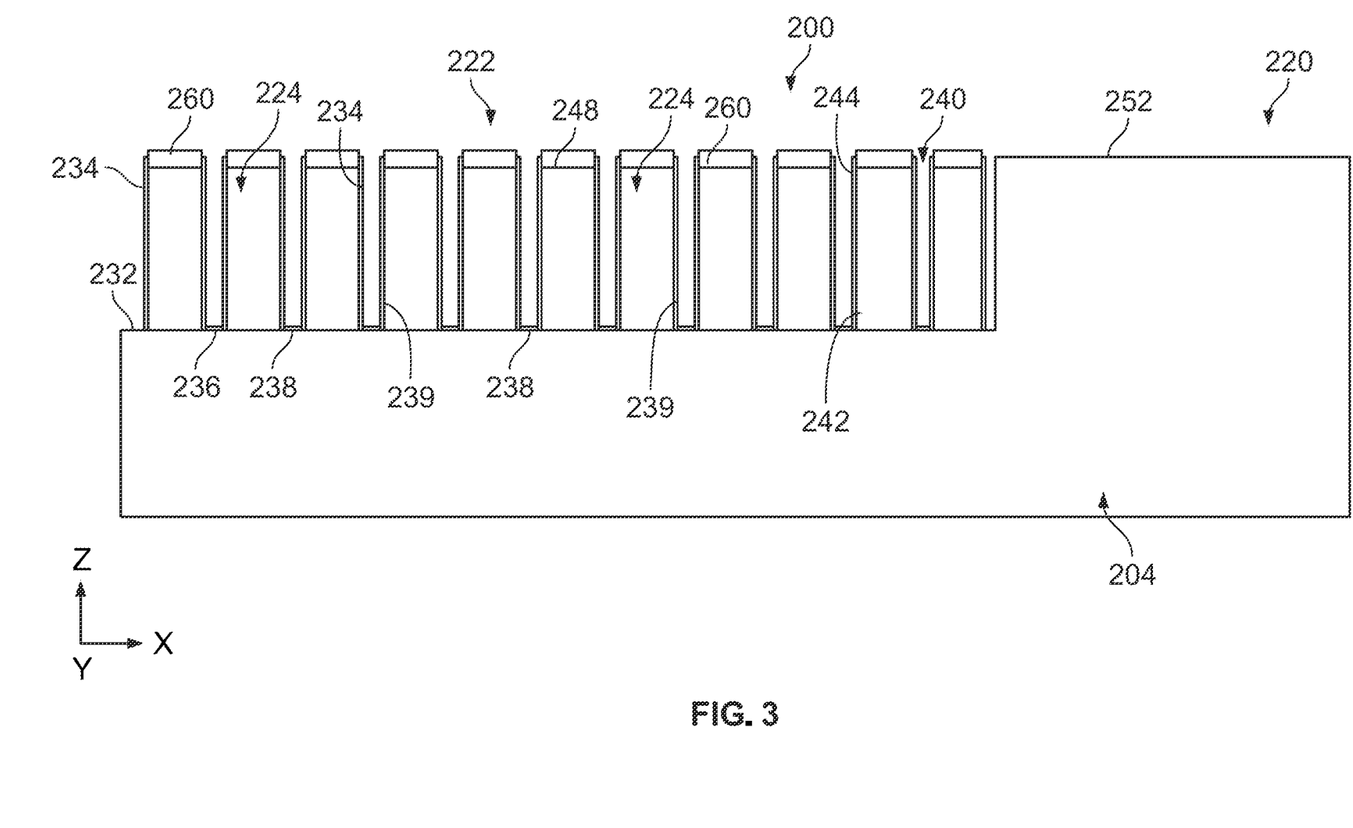
FIG. 3 is a close-up side view of a portion of another transaction card, in accordance with embodiments of the present disclosure.

FIG. 3 demonstrates a portion of another example modification area 222 of a body 204 of a card 200 according to embodiments of the present disclosure. As shown, the modification area 222 includes a plurality of structures 224 extending from a base 232, wherein adjacent structures 224 are separated by a trench 240. Each of the structures 224 may include a pair of sidewalls 234 extending from an upper surface 236 of the base 232. More specifically, each sidewall 234 may include a lower portion 242 adjacent the upper surface 236 of the base 232, and an upper portion 244 extending from the lower portion 242. In the embodiment shown, each pair of sidewalls 234 may extend substantially parallel to one another when the body 204 is in the flat, relaxed configuration. Although non-limiting, each of the structures 224 may generally have square or rectangular profile. A top surface 248 of each structure 224 may be substantially co-planar with a plane defined by an upper surface 252 of a planar section 220 of the body 204. The upper surface 236 of the base 232 may be parallel, but recessed, relative to the upper surface 252 of the planar section 220.

As further shown, the modification area 222 may include a visualization feature 238 present along the upper surface 236 of the base 232. In other embodiments, the visual feature 238 and/or a second visual feature 239 may also be present along one or both of the sidewalls 234. When the modification area 222 is in the flat, relaxed configuration, the visual feature 238 (and the second visual feature 239, if present) is obscured or less visible when viewed top down (e.g., in the negative z-direction). When the modification area 222 is in a bent configuration (not shown), the visual feature 238 becomes more visible as the structures 224 move apart from one another.

In some embodiments, the modification area 222 may further include a third visualization feature 260 along the top surface 248 of one or more of the structures 224. For example, the third visualization feature 260 may depict a design, color, or logo visible primarily when the modification area 222 is in the flat configuration. The visualization feature 238 and/or the second visual feature 239, which may include account identification indicia, may be visible primarily when the modification area 222 is in the bent configuration.

Figure 4A:
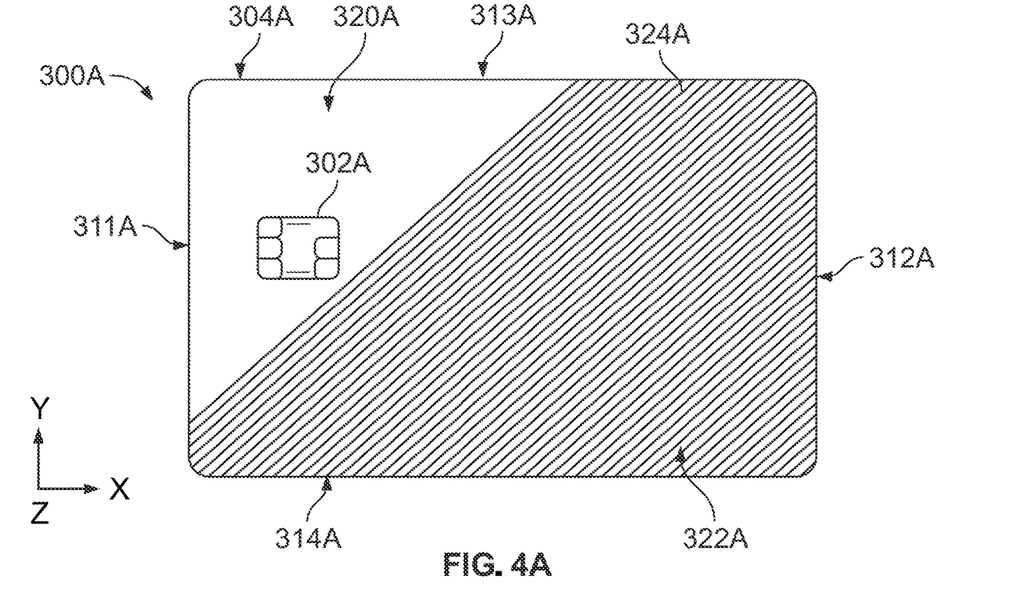
FIGS. 4A-4B are top views illustrating various transaction cards, in accordance with embodiments of the present disclosure.
Figure 4B:
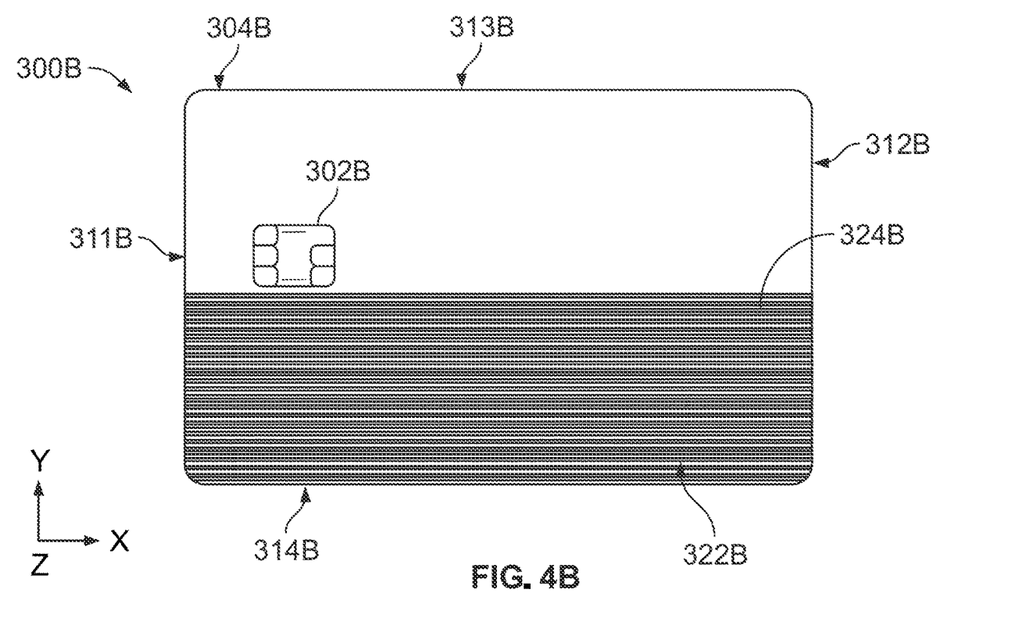

FIGS. 4A-4B demonstrate various alternative card designs according to embodiments of the present disclosure. As shown in FIG. 4A, a card 300A may include a modification area 322A, including a plurality of structures 324A, extending diagonally across a body 304A (e.g., in the y-direction and the x-direction). Said another way, the modification area 322A may extend between a first side 313A, a second side 314A, and a second end 312A. A first end 311A of the body 304A may primarily include a planar section 320A and a chip 302A formed therein.

As shown in FIG. 4B, a card 300B may include a modification area 322B, including a plurality of structures 324B, extending horizontally across a body 304B (e.g., in the x-direction). Said another way, the modification area 322B may extend between a first end 311B and a second end 312B of the body 304B. An upper portion (in the orientation shown) of the body 304B, which includes a chip 302B, may be devoid of any structures 324B. In other embodiments, the structures 324B of the modification area 322B may be non-parallel, extending in more than direction.

Figure 5:
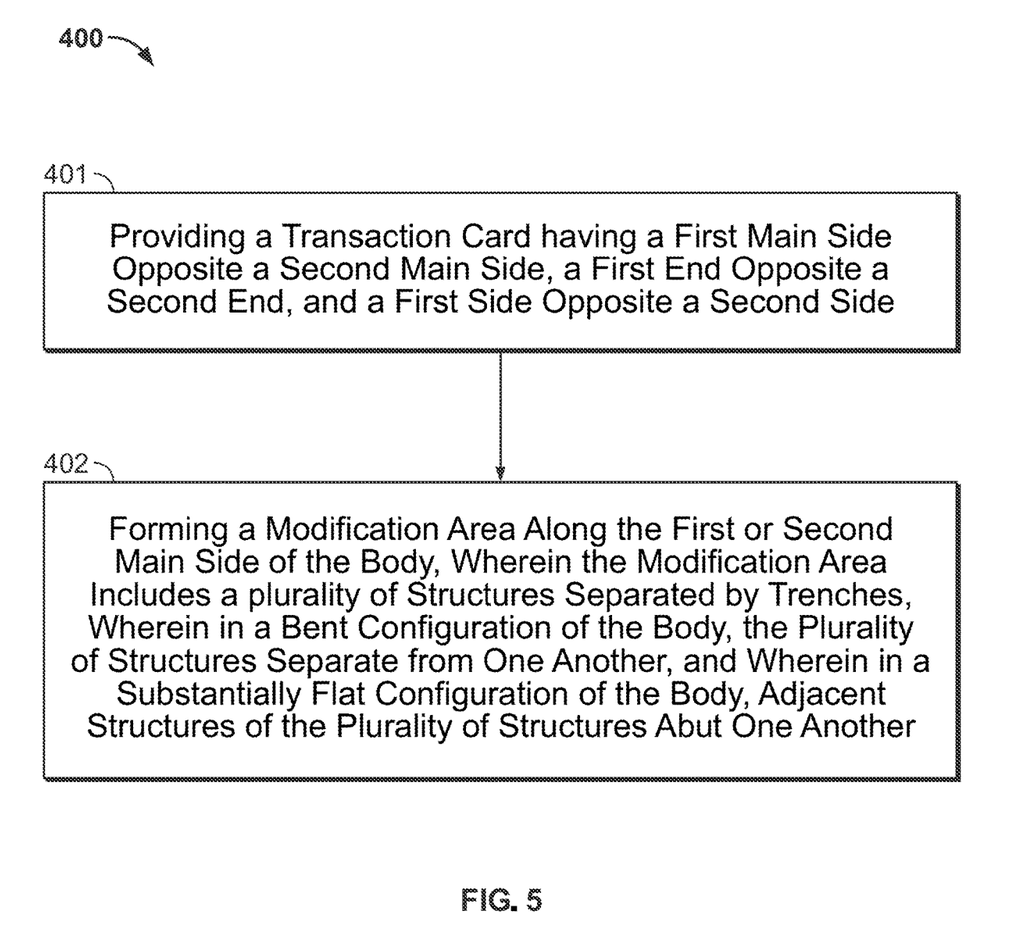
FIG. 5 illustrates a flowchart for performing methods in accordance with embodiments of the present disclosure.

Turning now to FIG. 5, a method 400 for forming transaction cards with one or more modification areas for selectively exposing a visualization feature according to embodiments of the disclosure will be described. At block 401, the method 400 may include providing a transaction card having a first main side opposite a second main side, a first end opposite a second end, and a first side opposite a second side. In some embodiments, an ID chip (EMV) is coupled to a first main side of the body.

At block 402, the method may include forming a modification area along the first and/or second main side of the body, wherein the modification area includes a plurality of structures separated by trenches or channels, wherein in a bent configuration of the body, the plurality of structures separate from one another, and wherein in a substantially flat configuration of the body, adjacent structures of the plurality of structures abut one another. In some embodiments, the modification area may be formed by routing the trenches into the first main side of the card, injection molding the plurality of structures, vacuum forming the plurality of structures, 3-D printing the plurality of structures, and/or UV printing the plurality of structures.

When 3-D printing is employed, the process may include depositing a visualization feature layer along an upper surface of a recessed section of the body. The recessed section may be formed by routing or etching the body until a desired depth is achieved. Alternatively, the recessed section of the body may be formed by building up material to form one or more planar sections of the body without depositing material in the modification area. After the visual feature layer is deposited, the structures may be built vertically using known additive manufacturing techniques, and may be the same or different material compared to the rest of the card. As the structures are being built, exposed sidewalls of the structures may also include material to form the visualization feature. In some embodiments, the visualization feature includes account identification indicia. In other embodiments, the structures are devoid of the visualization feature. In some embodiments, the sidewalls of the structures are oriented at a non-zero angle relative to a perpendicular extending from the upper surface of the recessed section of the body. Once the structures are built, an upper visualization layer may be deposited on a top surface thereof. The upper visualization layer may contain fanciful designs, colors, images, logos, etc. The ID chip may be coupled to a planar section of the body to ensure the ID chip remains secured to the body when the modification area is bent.

Once the modification area is complete, the card may be bent by a user to selectively expose or hide the visualization feature. By hiding the visualization feature in the relaxed, unbent state of the card, the card account number is less likely to be exposed unintentionally.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the cards 100, 200, 300A, and 300B described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 400 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 400 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:
1. A transaction card, comprising:
a body comprising a first main side opposite a second main side;
a plurality of structures extending from at least one of the first or second main sides, wherein in a bent configuration of the body, the plurality of structures separate from one another, and wherein in a substantially flat configuration of the body, adjacent structures of the plurality of structures abut one another, wherein the plurality of structures define a plurality of trenches each comprising a first sidewall opposite a second sidewall and a base extending between the first sidewall and the second sidewall;
a visual feature along at least one of the first sidewall, the second sidewall, or the base, wherein in the bent configuration of the body, the visual feature is exposed, and wherein in the substantially flat configuration of the body, the visual feature is hidden; and wherein the first sidewall and the second sidewall are nonparallel to one another in the substantially flat configuration of the body.

2. The transaction card of claim 1, wherein the first sidewall and the second sidewall are nonparallel to one another in the substantially flat configuration of the body, and wherein the first sidewall and the second sidewall are nonparallel to one another in the bent configuration of the body.

3. The transaction card of claim 1, wherein the first and second sidewalls each include an upper portion and a lower portion, and wherein upper portions of the adjacent structures are in contact with one another in the substantially flat configuration of the body.

4. The transaction card of claim 1, wherein the visual feature comprises account identification indicia.

5. The transaction card of claim 1, further comprising an identification chip coupled to the first main side of the body.

6. The transaction card of claim 1, wherein the body further comprises a first end opposite a second end and a first side opposite a second side, wherein the plurality of structures extend between the first side and the second side.

7. A transaction card, comprising:
a body comprising a first main side opposite a second main side, a first end opposite a second end, and a first side opposite a second side;
a plurality of structures extending from at least one of the first or second main sides, wherein when the body is bent in a first direction, the plurality of structures separate from one another, and wherein when the body is bent in a second direction, adjacent structures of the plurality of structures are brought together, wherein the plurality of structures define a plurality of trenches each comprising a first sidewall opposite a second sidewall and a base extending between the first sidewall and the second sidewall; and
a visual feature along at least one of the first sidewall, the second sidewall, or the base, wherein when the body is bent in the first direction, the visual feature is exposed, and wherein when the body is bent in the second direction, the visual feature is hidden; and
wherein the first sidewall and the second sidewall are nonparallel to one another in a substantially flat configuration of the body.

8. The transaction card of claim 4, wherein the first sidewall and the second sidewall are nonparallel to one another when the body is bent in the first direction, and wherein the first sidewall and the second sidewall are nonparallel to one another when the body is bent in the second direction.

9. The transaction card of claim 8, wherein the first sidewall and the second sidewall are nonparallel to one another when the body is bent in the second direction.

10. The transaction card of claim 8, wherein the first and second sidewalls each include an upper portion and a lower portion, and wherein upper portions of the adjacent structures are in contact with one another when the body is bent in the second direction.

11. The transaction card of claim 10, wherein the plurality of structures extend between the first side and the second side of the body.

12. A transaction card, comprising:
  a body comprising a first main side opposite a second main side, the first main side including one or more planar sections and a modification section;
  a plurality of structures within the modification section, the plurality of structures each including a pair of sidewalls extending from a base of the modification section;
  a visual feature formed on at least one of the pair of sidewalls or the base of the modification section, wherein in a bent configuration of the body, the plurality of structures separate from one another to expose the visual feature, and wherein in a substantially flat configuration of the body, the plurality of structures are brought together to conceal the visual feature, wherein each sidewall of the plurality of structures includes an upper portion and a lower portion, wherein upper portions of adjacent structures of the plurality of structures are in contact with one another in the substantially flat configuration of the body, and wherein lower portions of adjacent structures of the plurality of structures are separated from one another in the bent configuration of the body; and wherein the pair of sidewalls are nonparallel to one another in the substantially flat configuration of the body.

13. The transaction card of claim 12, wherein the pair of sidewalls are nonparallel to one another in the substantially flat configuration of the body, and wherein the pair of sidewalls are nonparallel to one another in the bent configuration of the body.

14. The transaction card of claim 12, wherein the visual feature comprises account identification indicia.

* * * * *

UNITED STATES PATENT AND TRADEMARK OFFICE
CERTIFICATE OF CORRECTION

PATENT NO. : 12,014,232 B2
APPLICATION NO. : 17/961919
DATED : June 18, 2024
INVENTOR(S) : Bryant Yee, Tyler Maiman and Cruz Vargas It is certified that error appears in the above-identified patent and that said Letters Patent is hereby corrected as shown below:

In the Claims

Claim 8: replace "The transaction card of claim 4..." with "The transaction card of claim 7...".

Claim 11: replace "the transaction card of claim 10..." with "The transaction card of claim 7...".

Signed and Sealed this
Third Day of September, 2024

*Katherine Kelly Vidal*

Katherine Kelly Vidal
*Director of the United States Patent and Trademark Office*